Feb. 25, 1969 D. W. BARGEN 3,430,077
SEMICONDUCTOR TEMPERATURE TRANSDUCER
Filed Sept. 13, 1965
FIG. 1.
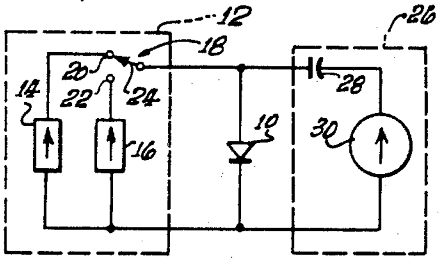
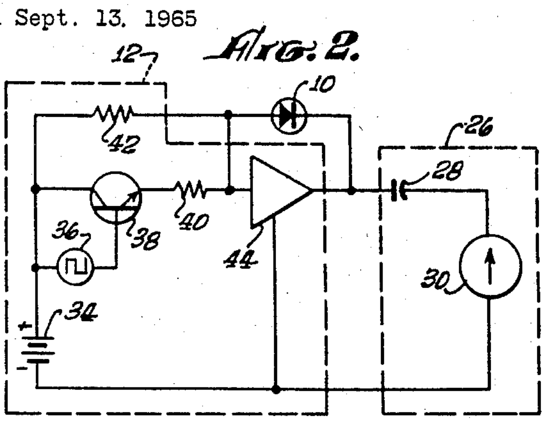
FIG. 2.
FIG. 3.
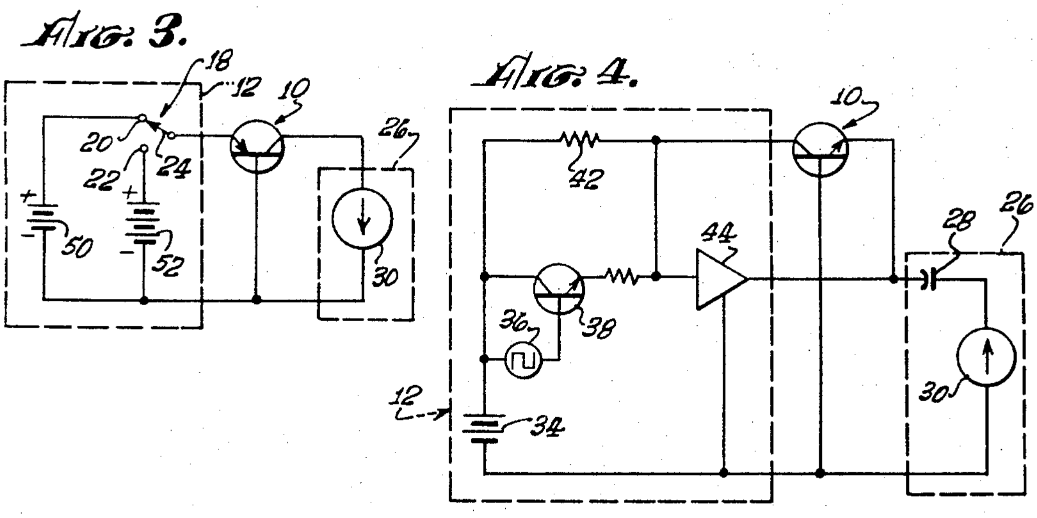
FIG. 3, FIG. 4.
FIG. 5.
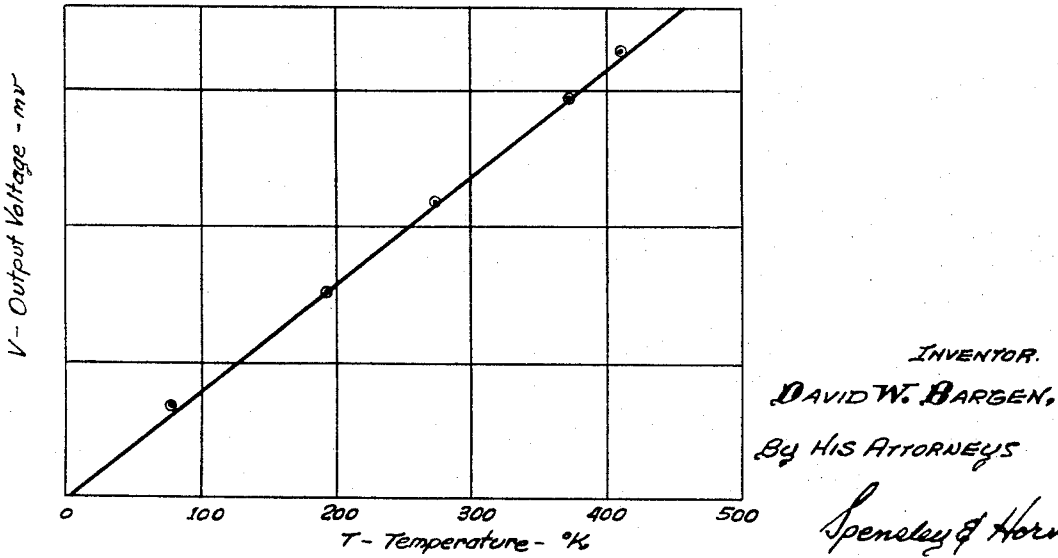
INVENTOR.
DAVID W. BARGEN,
BY HIS ATTORNEYS
Spensley & Horn United States Patent Office 3,430,077

Patented Feb. 25, 1969

3,430,077

SEMICONDUCTOR TEMPERATURE TRANSDUCER

David W. Bargen, Pasadena, Calif., assignor, by mesne assignments, to Whittaker Corporation, Los Angeles, Calif.

Filed Sept. 13, 1965, Ser. No. 486,629

U.S. Cl. 307—310 15 Claims

Int. Cl. G01k 5/52, 7/00

This invention relates to a semiconductor temperature sensor or transducer. In particular, this invention relates to a semiconductor temperature sensor wherein the junction is operated with energy having an alternating characteristic which in effect eliminates the saturation current from the junction output signal. In addition, a solid state device having more than one junction and energized by such an alternating energy is employed to further improve linearity by greatly reducing the effects of recombination currents and leakage currents.

Within the past decade there have been a number of prior art devices that use semiconductor diodes and transistors as temperature sensors. These devices in general have employed the reverse or saturation current of a junction, and its variation with temperature as the basis for sensing temperature changes. Typical prior art devices employing the variation of saturation current to sense temperature are shown in U.S. Patent No. 2,871,376, issued on Jan. 27, 1959, to E. R. Kretzmer, and U.S. Patent No. 3,102,425, issued to A. E. R. Westman et al., on Sept. 3, 1963. Such devices employ the saturation current under static or DC conditions. Such devices, as a result of employing the DC saturation current as the sensing characteristic, are strongly dependent on junction doping, geometry, specific temperature range of operation, as well as other particular construction characteristics. As a result of such particular construction dependency, it is most difficult to obtain devices which are reproducible, interchangeable, linear in operation, and stable. In addition, the instability of such devices is further aggravated by the fact that current due to surface recombination and leakage also contributes to the output of the junction. Such current tends to vary with time, thus contributing to the instability of the temperature sensor.

In an effort to remedy the shortcomings and disadvantages of the prior art devices, it was discovered that by energizing a junction with a signal having an alternating or changing characteristic the saturation current could be eliminated as the determining factor of the temperature sensor. Thus, the invented sensor supplies an output signal directly related to temperature and substantially independent of the saturation current. The manner in which this is accomplished can readily be understood by considering the simplified theory of PN junction current flow. The equation for current across a junction is expressed as:

$$I=I_s\left[\exp\left(\frac{qV}{KT}-1\right)\right] \quad (1)$$

where $I$=current through junction
$I_s$=saturation current
$q$=electronic charge
$V$=voltage across junction
$K$=Boltzmann's constant
$T$=absolute temperature Previous attempts to use this current characteristic as the basis of a temperature sensor have measured current I with constant voltage V, or voltage V with constant current I. In either case, saturation current, $I_s$, enters directly into the results. Because of this, the results depend on geometry and other junction parameters as discussed above, which are complex functions of temperature.

Now assume that a junction diode obeys Equation 1 and examine the current-voltage characteristic at the same temperature but at two different currents $I_1$ and $I_2$. The result is:

$$I_1=I_s\left[\exp\left(\frac{qV_1}{KT}\right)-1\right] \quad (2A)$$

$$I_2=I_s\left[\exp\left(\frac{qV_{1/2}}{KT}\right)-1\right] \quad (2B)$$

where the subscripts identify corresponding voltages and currents.

Clearly, the ratio of the currents is given by $$\frac{I_2}{I_1}=\frac{\exp\left(\frac{qV_2}{KT}\right)-1}{\exp\left(\frac{qV_1}{KT}\right)-1} \quad (3)$$

It is seen that if one measures the ratio of two currents and compares it to a function of two voltages as shown by (3), the temperature can be determined without regard to the saturation current. Equation 3 can be simplified considerably by operating the junction diode in the forward direction with voltages greater than about 0.1 volt so that $$\frac{qV}{KT}\gg 1 \quad (4)$$

In this case, Equation 3 reduces to $$\frac{I_2}{I_1}=\exp\frac{q}{KT}(V_2-V_1)=\exp\frac{q\Delta V}{KT} \quad (5)$$

where $$\Delta V=V_2-V_1$$

Solving Equation 5 for ΔV gives $$\Delta V=T\frac{K}{q}\ln\left(\frac{I_2}{I_1}\right) \quad (6)$$

Thus, it is seen from (6) that an output voltage ΔV, directly proportional to the absolute temperature T, can be obtained if the difference voltage ΔV, corresponding to two different current levels is measured. A junction can be made to operate in accordance with Equation 6 by energizing the junction with a current having at least two values representative of $I_2$ and $I_1$ and maintaining these values at a relatively constant ratio. With the junction so energized and the terms K and $q$ constants, the difference voltage ΔV resulting from the current is dependent solely on the temperature of the junction. The difference voltage ΔV resulting from the currents $I_1$ and $I_2$ may readily be measured with standard AC meters. Alternatively, the junction diode may be made to operate in accordance with Equation 5 by applying a difference voltage to the junction diode and measuring the resulting current ratio. The energization by a difference voltage or current ratio is included within the phrase, energization by signal having alternating characteristics, as used hereinafter.

It has been found that junction devices such as diodes closely conform to the simplified theory set forth above; but further study of junction performance on a more general basis has given rise to improved performance of the invented temperature sensor. A more general expression for a current through a forward biased junction is given by the equation:

$$I=A(T)\left[\exp\left(\frac{qV}{KT}\right)-1\right]+B(T,V)\left[\exp\left(\frac{qV}{nKT}\right)-1\right]+C(T)V \quad (7)$$

In this expression, the first term is due to the diffusion mechanism discussed above. The second term is due to recombination-generation phenomena in the depletion layer and at the surface of the device while the third term is due to ohmic leakage. Each of the coefficients in front of the terms above is dependent on temperature and in addition, the coefficient of the recombination-generation term depends also on the applied voltage. In addition, there are other terms of similar complexity which become important at high current levels.

The complexity of Equation 7 would, at first glance, make the thought of using a junction as a temperature sensor seem impractical. However, in the article, "Effects of Surface Recombination and Channel on PN Junction and Transistor Characteristics," by Chih-tang-Sah, IRE Transactions on Electron Devices, January 1962, it was pointed out that of these terms only the diffusion term (first term of Equation 7) contributes to the collector current in transistor action. In fact, it is this phenomenon which largely accounts for the decrease in current gain of silicon transistors at low collector currents. Thus, by using a transistor and measuring a signal related to the collector current it is possible to get an output which depends almost exclusively on the diffusion term of Equation 7 and eliminates the effects of the other terms.

The combination of measuring the output signal of the temperature sensor across the collector junction and operating the base-emitter with a signal having alternating characteristics provides a device that closely follows the ideal theory expressed by Equation 6. Such a temperature sensor is linear in operation, independent of particular device features such as doping, geometry and saturation current. The sensor is readily reproducible, easily calibrated and interchangeable with other similar devices. The invented device may be readily fabricated from commercially available parts, has no DC drift, and may be calibrated by one-point calibration.

Briefly, the structure which accomplishes the foregoing advantageous operation comprises a solid state junction means for supplying an output signal related to temperature when energized; an energizing means for applying a signal having a plurality of levels to said junction means; and, means for sensing the output signals from said solid state means resulting from said energizing signal having a plurality of levels, whereby the output signal has a characteristic related to temperature and substantially independent of the specific characteristics of the solid state junction means.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

The above structure and advantages may be readily understood by referring to the detailed specification which follows, along with the drawings, wherein:

FIGURE 1 is a simplified circuit diagram of an embodiment of the invented sensor employing a single junction;

FIGURE 2 is a circuit diagram of an embodiment of the invented sensor employing a single junction and circuitry for automatically applying a signal having at least two values to the junction;

FIGURE 3 is a simplified circuit diagram of an embodiment of the invention employing a plurality of junctions;

FIGURE 4 is a circuit diagram of an embodiment of the invention employing a plurality of junctions and circuit means for automatically applying a signal having at least two different values to one of the plurality of junctions; and, FIGURE 5 is a graph showing the relationship of the output voltage ($\Delta V$) and temperature for a circuit such as the one shown in FIGURE 4.

Referring to FIGURE 1, an embodiment of the invention is shown including a diode 10 which functions as a means for supplying an output signal related to temperature when energized. This diode may typically be a junction diode such as 1N458. The diode 10 is connected to an energizing means 12 for supplying a signal to diode 10 having an alternating characteristic and in particular a plurality of values in accordance with Equations 5 and 6. More specifically, the energizing means 12 comprises a first current source 14 which supplies the current $I_1$ and a second current source 16 which supplies a current $I_2$. The current sources 14 and 16 are coupled to the anode of diode 10 via switch 18 which includes contacts 20 and 22 and switch arm 24. The switch arm 24 alternately abuts contacts 20 and 22 to alternately supply currents $I_1$ and $I_2$ to diode 10. The movement of switch arm 24 from contact 20 to 22 results in the current ratio $I_2/I_1$ being applied to the junction of diode 10 in accordance with Equation 6. In general it is preferred that this current ratio be maintained a constant value. It should be understood that while the switch 18 is shown as a mechanical arrangement, any of the well known electrical or electronic or other switching means may be employed as a substitute for the switch 18. Similarly, the current sources 14 and 16 may be replaced by voltage sources in accordance with the well known equivalent circuit theorems.

The diode 10 is connected to a means 26 responsive to the output signal from diode 10 arising as a result of the application of currents $I_1$ and $I_2$. Such a sensing means may comprise a capacitor 28 which readily passes the alternating characteristic of the diode output signal to an AC voltmeter 30 connected across the diode 10. The capacitor 28 prevents any DC component from passing to the voltmeter.

In operation, the switch 18 alternately connects current sources 14 and 16 to the diode 10. The application of these currents to diode 10, with its junction at a given temperature, results in voltmeter 30 displaying a substantially constant value. As the temperature of the junction of diode 10 is altered, the voltage displayed by a voltmeter 30 will change in a linear manner. The diode 10 when operated with a signal having an alternating characteristic provides an output which varies directly with temperature. This characteristic, in accordance with Equation 6, is independent of the particular construction of diode 10. Virtually any junction diode may be employed, so long as the value of currents $I_1$ and $I_2$ are maintained at a predetermined ratio. From this it can be seen that the invented temperature sensor enables junction devices to be readily employed as temperature sensors with maximum interchangeability. Along with this interchangeability the invented temperature sensor may be readily reproduced, is linear in operation, may be calibrated by one-point calibration, and is not subject to DC drift. In fact, it is possible that a secondary temperature standard could be achieved with the invented device because of the simple, fundamental nature of the physics involved in the sensor operation.

An alternate embodiment of the invention is shown in FIGURE 2 and includes an energizing means 12 that automatically and alternately applies currents $I_1$ and $I_2$ to the diode 10. In this embodiment the same numerals as employed in FIGURE 1 are utilized to designate similar elements. The energizing means 12 in this embodiment comprises a DC voltage source 34 such as a battery, a square wave source 36 coupled to the DC source 34 and the base of a switching element 38, such as a NPN transistor. The transistor 38 has its collector coupled directly to the positive terminal of battery 34 and its emitter connected to a first resistor 40 of an energy dividing means which also includes resistor 42. The resistor 42 has one end connected to the cathode of diode 10 and its other end connected to the collector of transistor 38 and to the positive terminal of battery 34. Thus, the resistor 42 is connected in parallel with resistor 40 and transistor 38 to form an energy dividing network and specifically a current dividing network. The square wave source 36 alternately turns the transistor 38 on and off so that in effect the resistor 40 is alternately connected and disconnected in the network.

An operational amplifier 44 is connected across the diode 10 to enable the voltage source 34 and fixed resistors 40 and 42 to determine the two current levels $I_1$ and $I_2$ supplied to diode 10. To perform this function a high gain amplifier is employed, typically having an open-loop voltage gain in an excess of a 1000. By using such an amplifier the input of the amplifier may be maintained at ground potential or very close thereto, which is at the same voltage as the cathode of diode 10. This voltage is typically 0.0007 volt for an open-loop voltage gain of 1000. The output of amplifier 44 would typically be at —0.70 volt. The input is maintained substantially constant, as changes in current to diode 10 only slightly effect the input voltage; thus, it is only the resistors 40 and 42 along with voltage source 34 that determines currents $I_1$ and $I_2$.

The sensing means 26 in this embodiment is identical with the one shown in FIGURE 1. It comprises meter 30 and capacitor 26.

In operation, the square wave source 36 alternately turns transistor 38 on and off, resulting in a current being supplied to diode 10 which is first determined essentially by resistor 42 and then determined essentially by the parallel combination of the resistors 40 and 42. The output voltage sensed by voltmeter 30 in this embodiment is substantially described by the following equation:

$$\Delta V = T\frac{K}{q}\ln\left(1+\frac{R_1}{R_2}\right) \tag{8}$$

providing the amplifier gain is high. Thus, it is seen from Equation 7 that the output voltage ΔV is directly proportional to temperature, and the sensitivity depends only on two universal constants and the ratios of fixed resistors. This result suggests the possibility of obtaining excellent interchangeability and reproducibility of sensors.

FIGURES 3 and 4 show embodiments of the invention very similar to the ones shown in embodiments 1 and 2 with the exception that a transistor is employed as the solid state means for supplying an output signal directly related to temperature when energized. The components employed in these embodiments are designated by the same numerals that similar components in FIGURES 1 and 2 were designated by.

In FIGURE 3, transistor 10 is a PNP transistor with its emitter connected to switch arm 24. The switch arm 24 moves to abut contacts 20 and 22 and alternately connect the emitter to one terminal of a pair of voltage sources 50 and 52. The voltage sources 50 and 52 typically take the form of batteries. The negative terminals of voltage sources 50 and 52 are connected to the base of transistor 10 which may be considered ground. It can be seen that the moving of switch arm 24 to alternately abut the contacts 20 and 22 results in a signal voltage being applied to the base-emitter circuit that has an alternating characteristic. This results from the switch arm 24 first contacting the positive terminal of battery 50 and then contacting the positive terminal of battery 52.

The collector of transistor 10 is connected to the base via the sensing or indicating means 30. This essentially amounts to short circuit connection between the base and collector which enables the diffusion current to be substantially the only current supplied via the collector. The sensing means 30 may take the form of an AC current meter or a means responsive to the output signal from the collector such as an oscilloscope shunted by a low resistance.

In operation, the embodiment shown in FIGURE 3 is similar to the embodiment shown in FIGURE 1 with the exception that the input and output from the solid state element are taken from different electrodes. By operating the transistor 10 in this manner an alternating output consistent with Equation 5 can be obtained and by operating the transistor with the base and collector shorted the collector-base junction does not contribute errors due to its saturation current and leakage. Thus, it is possible to obtain an output which very nearly obeys the ideal performance predicted in Equation 6.

The transistor 10 in FIGURE 3 may be regarded as performing a filtering function. The emitter current of the transistor contains all of the components indicated by Equation 7, but only the diffusion component passes through the base region into the collector of the transistor. The other components of the emitter current are filtered out by the base of the transistor and pass out through the base terminal. In addition, collector-base leakage currents are prevented by operating the collector-base junction essentially short-circuited, i.e., with very small potential difference, Thus, the short-circuit collector current is due primarily to the diffusion component of the emitter current and is related to the emitter-base junction voltage and temperature by the ideal Equation 1 to a very good approximation. As a result, Equation 6 also holds for arrangement of FIGURE 3 using a transistor, since it was derived from Equation 1, provided ΔV is measured across the emitter-base junction and $I_1$ and $I_2$ are measured as short-circuit collector currents.

Referring to FIGURE 4, an embodiment of the invention is shown combining the embodiment shown in FIGURES 2 and 3. This embodiment employs the transistor concept of FIGURE 3 and the energizing and sensing arrangement shown in FIGURE 2. More specifically, the NPN transistor 10 has its collector-emitter elements connected in circuit with the energizing means 12 and sensing means 26 in the same manner that the cathode and anode are connected in circuit in the embodiment shown in FIGURE 2. The base of transistor 10 is connected to the negative terminal of battery 34 and to the collector of transistor 10 via the input of amplifier 44 which amounts to short circuiting the base to the collector because of the high open-loop voltage gain of the amplifier.

The energizing means 12 is substantially identical with with the energizing means 12 shown in FIGURE 2 and described above. The energizing means 12 automatically and alternately supplies currents of a predetermined ratio to the collector of transistor 10. An output voltage is supplied to the base-emitter of transistor 10 as determined by the collector currents to sensing means 26 via amplifier 44. The sensing means 26 is also identical with the one shown in FIGURE 2 and described above. The amplifier output and the emitter of transistor 10 are connected to the meter 30 via capacitor 28 in the same way as described with regard to the embodiment shown in FIGURE 2. The meter 30 senses the variations of emitter-base voltage resulting from temperature changes and the constant ratio of collector input currents.

In this embodiment, the transistor 10 may be regarded as being driven by the alternating voltage across the emitter-base junction but the output voltage is also taken across this junction in accordance with Equation 6. This output voltage results in a collector current filtered by the action of the base as discussed in connection with FIGURE 3. The collector current is essentially the current through $R_1$ and $R_2$ since the input impedance of the amplifier is made to be high. Thus, the collector current is controlled which in turn controls the emitter voltage. The amplifier output 43 drives the emitter of transistor 10 just hard enough to make the voltage at the amplifier input 45 zero. The collector-base voltage is essentially zero, while the collector current is determined by $R_1$ and $R_2$. Thus, the collector-base voltage and collector current of transistor 10 are controlled simultaneously. This arrangement results in a practical circuit with meters 30 for reading the output voltage readily available.

In operation, the energizing means 12 supplies an input signal having an alternating characteristic to transistor 10 in the same manner as the energizing means in FIGURE 2 supplies a signal to the diode shown. The transistor 10 supplies an output signal related to the temperature of the base-emitter junction to the sensing means 26, which signal is substantially free of the effects of saturation current and leakages errors and closely follows the ideal operation predicted in Equation 6. Thus, the embodiment shown in FIGURE 4 combines the best features of the embodiments shown in FIGURES 1 to 3. It operates in accordance with alternating energization mode of temperature sensing, employs the shorted collector-base junction, makes use of the filtering action of the base to remove unwanted current components, and energizes the transistor automatically with at least two levels of a signal; that is, current or voltage. With such features incorporated in the embodiment shown in FIGURE 4, a very effective temperature sensor arrangement results.

FIGURE 5 shown the results of a temperature test of a silicon transistor using the principles described with regards to the embodiments shown in FIGURES 3 and 4. The tested circuit was operated at current levels of $I_1$= 10 microamperes and $I_2$=100 microamperes with the transistor employed being a 2N2222. For a 10:1 change in current, Equation 6 may be simplified to:

$$\Delta V=\frac{K}{g}\ln 10T \qquad (9)$$

$$\left(\frac{K}{g}=8.61675\times10^{-5}\text{ v.}^\circ\text{K. and ln }10=2.30259\right)$$

and $$\Delta V=(1.98408\times10^{-4}\text{ v. }^\circ\text{ K.})T \qquad (10)$$

In FIGURE 5, Equation 10 has been plotted along with the experimental data derived in tests for a comparison of experimental data and theory. The agreement between experiment and theory is quite good, ranging from about + or −2° K. from 77° K. to 400° K. It should be noted that the output of voltage is substantially linear thus providing a linear temperature sensor. Further tests were performed on the invented temperature sensor shown in FIGURES 3 and 4 with a member of transistors being substituted into the circuit arrangement to determine approximate errors resulting from interchanging components. It was found that regardless of the particular device employed a ±2° K. maximum error resulted. It should be understood that these figures were arrived at with the commercially available transistors that were not graded for temperature sensing in any exclusive way. It is emphasized that the numbers quotted above are only approximations and refer to absolute accuracy, that is, the difference between measurement and theory. These results were obtained without calibration of the sensors. It is possible that if a single point calibration is employed, the temperature measurement accuracy would be improved by at least an order of magnitude. In fact, it is possible that a secondary temperature standard could eventually be achieved with this technique because of the simple fundamental nature of the physics involved in the sensor operation. Thus, it can be seen that a linear, reliable, predictable, temperature sensor has been devised, which is essentially independent of particular device characteristics such as junction saturation current, surface effects, recombination-generation phenomena, doping levels, and device processing technique. The invented temperature sensor is not subject to the drift and non-linearity associated with DC devices and it may be calibrated by one point calibration techniques, providing good accuracy over a wide temperature range such as −100° C. to +300° C.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A temperature sensor comprising:

a solid state junction means for supplying an output signal related to temperature when energized;

an energizing means for applying a signal to said junction means, said signal having at least two levels, each of said levels forward biasing said junction means; and, means for sensing the output signal from said junction means resulting from said energizing signal, whereby the output signal has a characteristic related to temperature and substantially independent of the specific characteristics of the junction means.

2. A temperature sensor that is interchangeable, reproducible, linear, and substantially independent of device characteristics, comprising:

a solid state junction means having the characteristic directly sensitive to temperature changes for supplying an output signal related thereto when energized;

energizing means for applying a signal to said junction means, said signal having at least two levels, each of said levels forward biasing said junction means; and means for sensing at least the output signal from said solid state means resulting from said energizing signal, whereby the output signal sensed has a characteristic related to temperature.

3. A linear temperature sensor comprising:

a solid state junction means having a characteristic sensitive to temperature changes for supplying an output signal related thereto when energized;

energizing means for generating a signal for forward biasing said solid state means havng an alternating characteristic, said energizing means coupled to said solid state means; and a means for sensing the output signal from said solid state means resulting from said alternating characteristics of the energizing signal, whereby the output signal sensed has a characteristic related to temperature and substantially independent of the saturation current of the solid state junction means.

4. A temperature sensor that is interchangeable, reproducible, linear and substantially independent of device characteristics, comprising:

a PN junction, said junction when energized by a signal having at least two levels, each of said levels forward biasing said junction, being governed by the expression $$\Delta V=T\frac{K}{q}\ln\frac{I_2}{I_1}$$

where ΔV is a difference voltage resulting from the currents $I_1$ and $I_2$, be applied to said junction, $q$ is the electronic charge, K is Boltzmann's constant, and T is the absolute temperature;

a circuit means for applying currents in the forward direction through said PN junction having at least successive levels of $I_1$ and $I_2$ to said PN junction; and, a circuit means for sensing the output signal resulting from the application of currents $I_1$ and $I_2$, whereby a signal related to temperature and substantially independent of device characteristics is supplied.

5. The method of sensing temperature variations with a solid state junction device comprising:

exposing the junction device to temperature variations;

simultaneously applying a signal to said device for forward biasing said device, said signal having alternating characteristics; and, deriving an output signal from the device having a characteristic that varies according to temperature variations and resulting from said applied signal, whereby temperature variations are readily sensed.

6. A temperature sensor comprising:

a solid state means for supplying an output signal related to temperature, having at least two junctions, a first of these junctions conducting a current substantially only by diffusion;

energizing means for applying a signal to said second junction; and, means for sensing an output signal from said first junction, whereby changes in the output signal from said first junction are dependent primarily upon temperature changes and the manner in which such temperature changes diffusion across said first junction.

7. The structure defined in claim 6 wherein said energizing means applies a signal having at least a plurality of values to said second junction.

8. The structure defined in claim 7 wherein said signal applied by said energizing means to said second junction is alternately and successively applied to said second junction and said plurality of values are maintained substantially constant during successive applications.

9. A temperature sensor comprising:

a solid state means for supplying an output signal directly related to temperature when energized, said solid state means having at least a first and second junction with said first junction conducting a current that is dependent substantially on diffusion through said first junction;

an energizing means for applying a signal having a plurality of levels to said second junction of said solid state means; and, means for sensing the output signal from said first junction resulting from said plurality of levels, whereby the output signal sensed has a characteristic related to temperature and substantially independent of the saturation current of said solid state means.

10. A temperature sensor comprising:

a solid state means for supplying an output signal directly related to temperature when energized, said solid state means having at least a first and second junction with said first junction having a current that is dependent substantially on diffusion through said first junction;

an energizing means for applying a signal having a plurality of levels to said first junction of said solid state means; and, means for sensing the output signal from said second junction resulting from said plurality of levels, said sensing means connected to substantially short circuit said first junction, whereby the output signal sensed has a characteristic related to temperature and substantially independent of the saturation current of said solid state means.

11. A temperature sensor comprising:

an energy source;

a solid state diode having an anode and a cathode;

an operational amplifier coupled across said anode and cathode;

a resistor divider means for alternately and automatically applying a first resistor and a second resistor in circuit between said energy source and said diode so as to forward bias said diode at two different levels; and means in circuit with said diode and responsive to the signal from said diodes for manifesting a response proportional to temperature, whereby a temperature sensor is provided independent of the particular characteristics of the diode.

12. A temperature sensor comprising:

an energy source means for supplying energy;

a temperature sensing transistor having an emitter, base and collector;

a divider means for alternately and automatically applying at least two different impedances across said transistor, said divider means coupling said energy source to said transistor via said impedance; and, means for sensing an output signal from said base and emitter resulting from said alternate application of said impedance by said divider means, said output signal primarily controlled by the temperature of the emitter and the base junction, whereby a temperature sensor is provided that is substantially independent of the particular characteristics of the transistor.

13. The structure defined in claim 12 wherein said divider means comprises a pair of resistors and a switching element connected to said resistor and to said energy source means; and, control means for switching said switching element to connect said first and second resistors in parallel.

14. The structure defined in claim 12 wherein an amplifier is connected between the collector and emitter and coupled to said divider means.

15. The structure defined in claim 14 wherein said amplifier is an operational amplifier having a relatively high input impedance sufficient to enable substantially all of the current to and from the divider means to be supplied to said transistor.

References Cited

UNITED STATES PATENTS

| | | | |
|---|---|---|---|
| 2,696,739 | 12/1954 | Endres | 317—33 |
| 2,871,376 | 1/1959 | Kretzmer | 307—310 |
| 3,083,319 | 3/1963 | Tiemann | 307—310 |
| 3,058,034 | 9/1962 | Sandin | 317—33 |
| 3,102,425 | 9/1963 | Westman | 307—310 |
| 3,142,987 | 8/1964 | Dowling | 73—362 |

JOHN S. HEYMAN, *Primary Examiner.*

H. A. DIXON, *Assistant Examiner.*

U.S. Cl. X.R.

73—362

UNITED STATES PATENT OFFICE

CERTIFICATE OF CORRECTION

Patent No. 3,430,077 Dated: February 25, 1969

D. W. Bargen

It is certified that error appears in the above-identified patent and that said Letters Patent are hereby corrected as shown below:

Column 2, formula (2B), that portion of the formula reading $\frac{qV_{\frac{1}{2}}}{KT}$ should read $\frac{qV_{2}}{KT}$ Column 5, lines 13 and 15, "volt" should read --volts--.
Column 5, line 22, the numeral "26" should read --28--.
Column 7, line 15, "shown" should read --shows--.
Column 7, line 17, "regards" should read --regard--.
Column 7, line 47, "quotted" should read --quoted--

SIGNED AND SEALED
APR 28 1970

(SEAL)
Attest:

Edward M. Fletcher, Jr.
Attesting Officer

WILLIAM E. SCHUYLER, JR.
Commissioner of Patents